United States Patent [19]

Cater

[11] Patent Number: 5,038,965
[45] Date of Patent: Aug. 13, 1991

[54] PUMP DISPENSER FOR DELIVERING A PREDETERMINED DOSAGE REGARDLESS OF METHOD OF ACTUATION

[75] Inventor: Miro S. Cater, Newtown, Conn.

[73] Assignee: Spruhventile GmbH, Stuhl, Fed. Rep. of Germany

[21] Appl. No.: 505,601

[22] Filed: Apr. 6, 1990

[51] Int. Cl.$^5$ .......................... B67D 5/52; B67D 5/40
[52] U.S. Cl. .................................... 222/255; 222/321;
222/378; 222/383; 222/385
[58] Field of Search .............. 222/255, 215, 320, 321,
222/370-372, 383-387, 378; 417/510

[56] References Cited

U.S. PATENT DOCUMENTS

| | | | |
|---|---|---|---|
| 4,089,442 | 5/1978 | Hafele et al. | 222/385 X |
| 4,245,967 | 1/1981 | Busselet | 417/510 |
| 4,693,675 | 9/1987 | Venus | 222/385 X |
| 4,726,747 | 2/1988 | Skorka | 222/383 X |
| 4,735,347 | 4/1988 | Schultz et al. | 222/385 X |
| 4,823,991 | 4/1989 | Skorka | 222/321 X |
| 4,941,595 | 7/1990 | Montaner et al. | 222/385 X |

Primary Examiner—Michael S. Huppert
Assistant Examiner—Kenneth De Rosa

[57] ABSTRACT

A finger operated pump dispenser employing interconnected upper and lower cylinders, first and second pistons disposed in the upper and lower cylinders, a hollow sleeve, and a stem which extends upwardly through the first piston into the sleeve. The first cylinder, the stem and the two pistons define a pump chamber which is filled with fluid. When the dispenser is actuated, fluid is displaced from the chamber into the second cylinder and a port is opened. The port can be made to open at the moment that all of the fluid is displaced into the second cylinder. Once the port is opened, the fluid is discharged and further piston movement enables fluid to be pulled upward out of the container secured to the dispenser via an opening formed between the second piston, stem and inner wall of the second cylinder refilling the chamber. The motions of pistons, stem and sleeve are so controlled that accurate dosage is produced independently of the method of actuation.

11 Claims, 6 Drawing Sheets

PUMP DISPENSER FOR DELIVERING A PREDETERMINED DOSAGE REGARDLESS OF METHOD OF ACTUATION

BACKGROUND OF THE INVENTION

Finger actuated fluid pump dispensers are adapted to be secured to containers which are filled with fluids and which can be manually operated to dispense such fluids. Such dispensers typically have actuators which are normally in raised position and which are manually depressed by finger actuation to initiate a discharge of a quantity of fluid from a container. When the manual pressure is removed, the actuators are automatically returned to the normal raised position.

For typical non-pharmaceutical uses such as dispensing of hair sprays or deodorants, a general purpose finger actuated fluid pump dispenser employs a dispensing system wherein the dispensing pressure depends upon the speed and duration of finger actuation and wherein the amount of fluid dispensed, known as the dosage is not regulated or metered accurately. The dosage will necessarily vary from time to time as the dispenser is used, because the variation in dispensing stroke can cause variations in dosage.

While dosage variation is not of great concern in most applications, control of dosage is of great concern in pharmaceutical applications where dosages must be accurately metered and cannot be varied because of variations in dispensing stroke. Accordingly, finger actuated fluid pump dispensers for pharamaceutical employ dispensing systems wherein dispensing pressure is properly controlled regardless of variations in the speed of finger actuation.

However, known finger actuated pump dispensers for pharmaceutical will only deliver accurately metered dosages when a specified method of actuation is employed. For example, the user must complete an actuation stroke. If the user interrupts the actuation stroke, the dosage will vary depending upon the method of such interruption.

The present invention is directed toward a finger actuated pump dispenser for pharmaceutical applications which not only discharges fluid at a predetermined pressure but also delivers a predetermined dosage regardless of the method of actuation employed.

SUMMARY OF THE INVENTION

Accordingly, it is an object of the present invention to provide a new and improved finger actuated fluid pump dispenser for pharmaceutical applications which discharges fluid at predetermined pressure and in a predetermined constant dosage regardless of variations in the method of actuation.

Another object is to provide a finger actuated fluid pump dispenser for pharmaceutical applications which employs a new and improved dispensing system which not only discharges fluid at predetermined pressure but also delivers a predetermined constant dosage regardless of the method of its actuation.

These and other objects and advantages of this invention will either be explained or will become apparent hereinafter.

In accordance with the principles of this invention, a finger actuated fluid pump dispenser is mounted on a fluid containing vessel. This dispenser when actuated will discharge fluid at predetermined pressure and will deliver a predetermined dosage regardless of the method of actuation.

To this end, the dispenser employs a vertical hollow elongated body with an upper section defining a first hollow vertical cylinder having an open upper end and having a first diameter. The body also has an integral lower section defining a second hollow vertical cylinder having a closed lower end with a central opening and having a second and smaller diameter. The lower end of the first cylinder is connected to the upper end of the second cylinder and a vertical bore extends completely through the body. A collar having a central opening encloses the upper end of the first cylinder.

A sleeve is open at upper and lower ends and has a first enlargement intermediate these ends, the sleeve having a vertical bore aligned with the body bore. The portion of the sleeve intermediate the upper end and the first enlargement extends upwardly through the collar opening. The first enlargement is disposed below the collar, and, together with the remaining portion of the sleeve, is disposed within the first cylinder.

A first hollow vertical piston having an upper open end and a lower closed end having a central opening is disposed and is vertically slidable within the first cylinder. The first piston is too large to penetrate the second cylinder.

A vertical stem has an upper vertical section with relatively small cross sectional area which extends upwardly through the first piston and through the sleeve bore. The upper section is spaced inwardly from the sleev bore, the space between the stem and the sleeve defining a fluid discharge path. The stem has an integral lower vertical section with larger cross sectional area. The lower section has an upper end which is adjacent and engagable with the lower end of the first piston. The cross sectional area of the lower section is smaller than that of the second cylinder so that the stem can move downwardly into the second cylinder.

A second hollow vertical piston has an upper end which is adjacent and engagable with the lower end of the lower section. The second piston is vertically slidable in the second cylinder and has a second enlargement intermediate its ends which engages the inner wall of the second cylinder.

First spring means is disposed in the first cylinder within the first piston between the lower end of the first piston and the first enlargement. Second spring means is disposed in the second cylinder between the lower end of the body and the enlarged portion of the second piston. An actuator is secured to the upper end of the sleeve and stem.

Means associated with the second piston and the second cylinder and actuated during at a selected position of the second piston with respect to the second cylinder during an upstroke establishes a fluid transfer path between the fluid in the container and the pump chamber formed by the space subtended by the inner wall of the first cylinder, the stem and the two pistons as will be explained below.

When the dispenser is mounted in the fluid filled container, it is first necessary to prime the dispenser to expel air so that the dispenser will be charged with fluid. Upon actuation, the sleeve, first piston and stem move downwardly together, with the force exerted downwardly by the first spring means on the first piston being larger then the force exerted upwardly by the second spring means on the second piston. The air below the sleeve, first piston and stem is compressed.

The lower end of the first piston bears against the upper end of the lower section of the stem, thus closing the discharge path. When the lower end of the first piston reaches the lower end of the first cylinder, its downward movement stops, since this end is too large to move into the second cylinder. However, the sleeve and the stem continue to move downward, causing the upper end of the lower section of the stem to separate from the lower end of the first piston, opening the discharge path and the compressed air is discharged therethrough.

When the actuation force is removed, the upward force of the second spring means reverses the movement so the stem and steeve move upward and the upper end of the lower stem section engages the lower end of the first piston, closing the discharge path.

The second spring means forces the second piston upward. When the second piston reaches a selected position with respect to the second cylinder, the means associated with the second piston and the second cylinder opens a path between the fluid in the container and the second cylinder, and the suction force draws fluid out of the container and upwardly in the second cylinder. As the second piston continues to move upward, the suction draws the fluid upwardly into the first cylinder. The volume subtended between the inner wall of the first cylinder, the stem and the first and second pistons constitutes a pump chamber which is filled with fluid during the upstroke.

The dispenser is then charged with fluid and is at rest ready for use to dispense a predetermined dosage at predetermined pressure. When the actuator is depressed, the stem, sleeve and first piston begin to move downwardly together against the force of the second spring means. However, the fluid in the pump chamber is not compressible and is forced out of the first cylinder downwardly into the second cylinder. The volume of fluid within the pump chamber remains constant. The pressure within the pump chamber increases throughout the downstroke and forces the two pistons to move apart relative to each other, overcoming the forces exerted against the pistons by the corresponding spring means. Towards the end of the downstroke, the first piston is separated from the lower section of the stem, opening the discharge port. The second piston begins to travel upward, reducing the volume of the pump chamber, thus discharging the fluid. The position assumed by the first piston at which discharge occurs can be so chosen, termed the discharge point, that the port will open at the moment when the entire volume of the pump chamber is displaced into the second cylinder.

The fluid volume to be discharged can be measured for any selected point at which the discharge path is to be opened, and this volume will always be the same for the point so selected. Hence the dosage is predetermined and is independent of the method of actuation.

Similarly, the dispensing pressure is a function of the cylinder and chamber diameters and the design of the spring means and is not dependent upon the intensity or duration of the finger pressure.

DETAILED DESCRIPTION OF PREFERRED EMBODIMENTS

Figure 1:
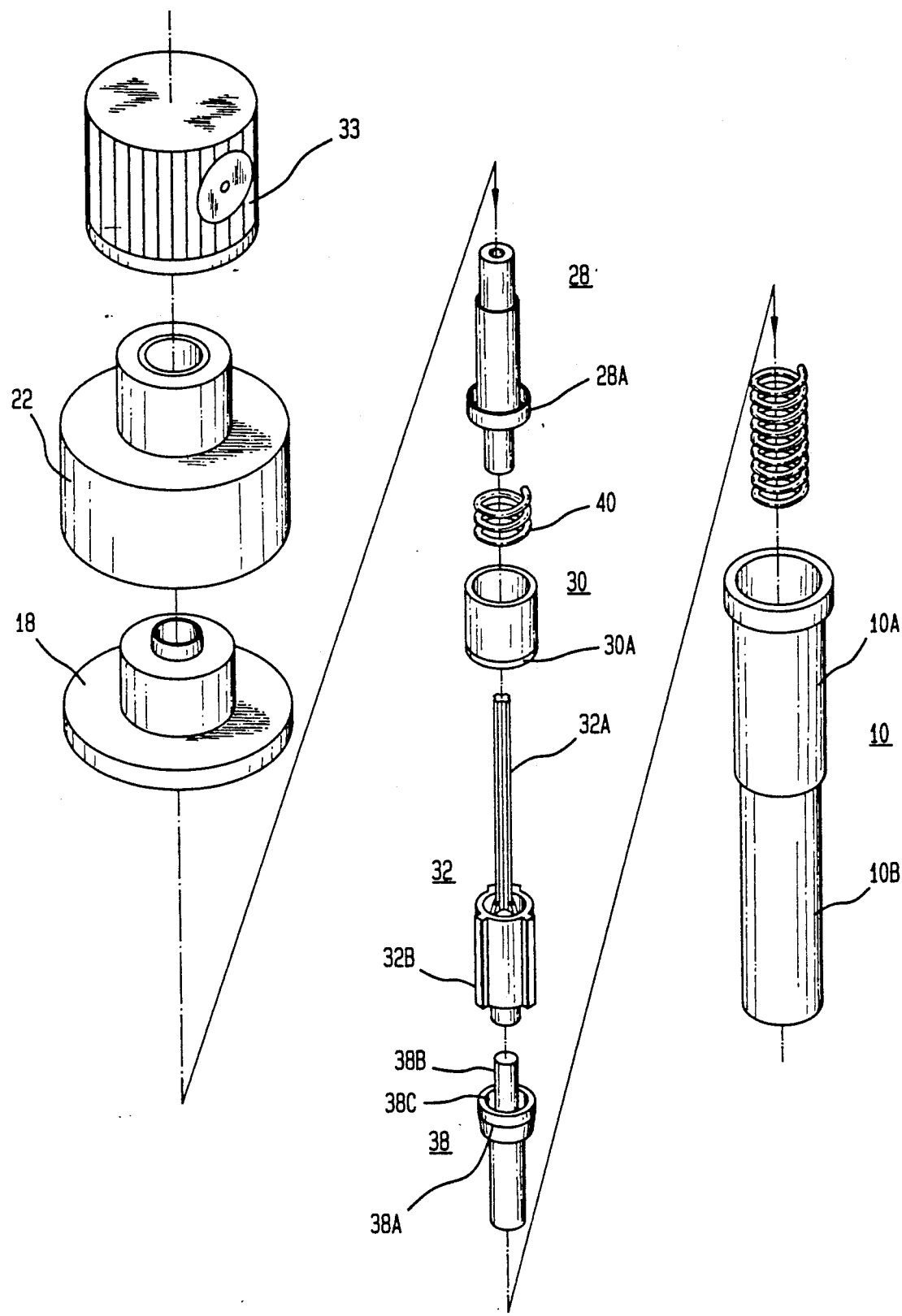
FIG. 1 is an exploded view of a preferred embodiment of the invention.
Figure 2:
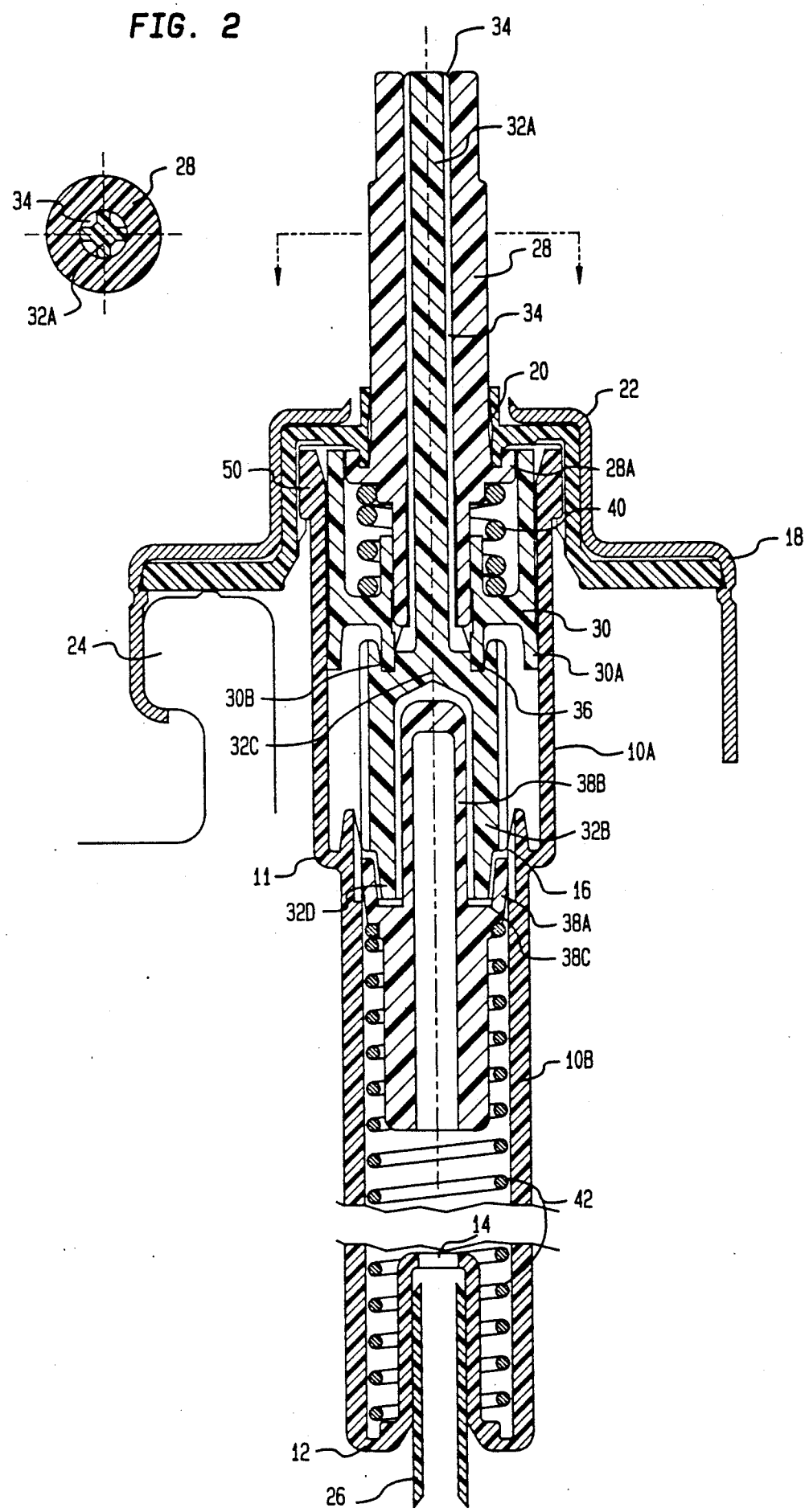
FIG. 2 is a vertical cross sectional view of the preferred embodiment as assembled and shown at the top of the down stroke after the dispenser has been primed.
Figure 3:
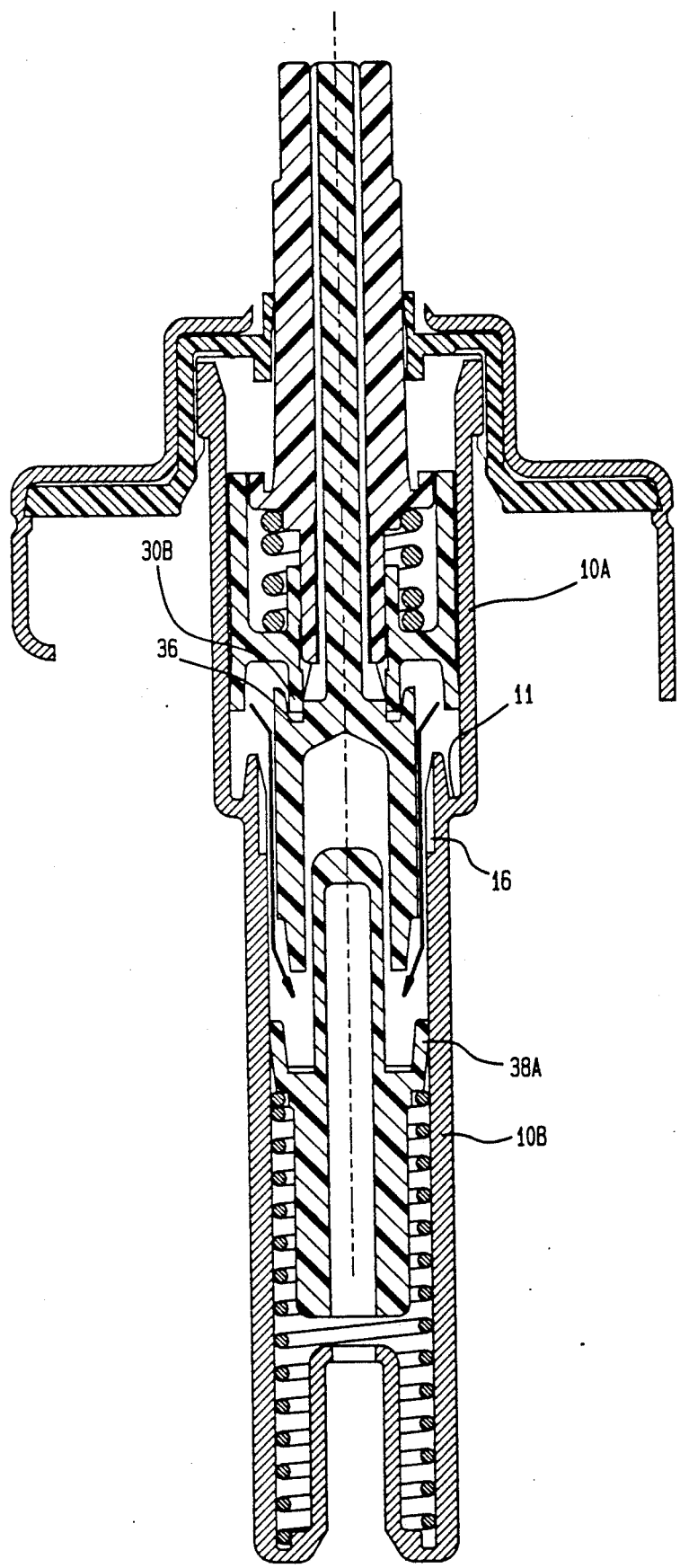
FIG. 3 is a view similar to FIG. 2 showing this embodiment in mid-position [it is the same for the downstroke and the upstroke].
Figure 4:
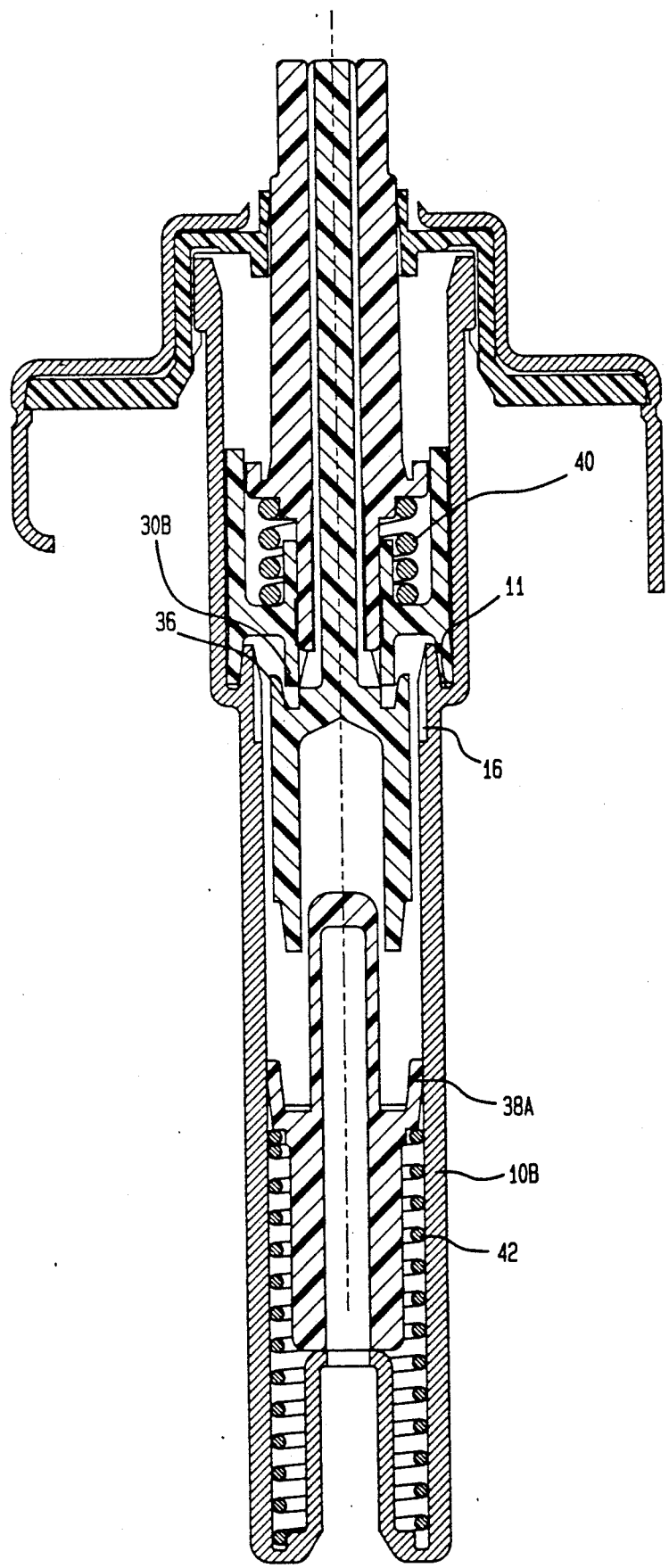
FIG. 4 is a view similar to FIG. 2 shows this embodiment at the bottom of the downstroke.

Referring now to FIGS. 1-5, a hollow body 10 has an upper hollow cylinder 10A having a first diameter and an open upper end. The body has an integral lower hollow cylinder 10B having a second and smaller diameter with a lower end 12 having a central opening 14 which is raised above the remainer of this lower end. The body has a vertical bore which extends completely through the body. Cylinder 10B has an open upper end with an inner recess 16 in its inner wall which is spaced outwardly from the remainder of the inner wall. The upper end of cylinder 10B is integral with the lower end of cylinder 10A but the outer periphery of the lower end of cylinder 10A is spaced away from the outer periphery of the upper end of cylinder 10B by a horizontal circular groove or recess 11.

A collar 18 snaps over the upper end of cylinder 10A and has a central opening 20 aligned with the vertical bore in the body. The collar is spaced from the upper end of cylinder 10A by one or more grooves 50 which form air passages. Collar 18 is surrounded by a cup 22 having a like aligned opening. The cup with the collar and body attached is fitted to the neck 24 of a container of fluid. A vertical dip tube 26 is fitted into the lower end 12 with its upper opening engaging opening 14.

A vertical sleeve 28 open at both ends has a vertical bore aligned with the body bore. Sleeve has an enlargement 28A disposed intermediate its ends. The upper portion of the sleeve above enlargement 28A extends upwardly through the openings of collar and cup with the enlargement 28A and the remainder of the sleeve disposed in the first cylinder. The portion of the sleeve below enlargement 28A is smaller in diameter than the upper portion of the sleeve.

A first hollow vertical piston 30 has an open upper end and a lower closed end with a central opening aligned with the cylinder bore. The lower closed end has outer and inner downwardly extending concentric rings 30A and 30B. Piston 30 is vertically slidable within cylinder 10A. Ring 30A is engagable with groove 11 to limit the downward travel of piston 30. The air spaces 50 enables air to flow into the region within the first cylinder bounded by the collar and the lower end of the piston 30 to prevent development of a vacuum like condition therein during operation of the dispenser.

A vertical stem 32 has a solid upper vertical section 32A of relatively small cross sectional area which extends upwardly through the piston 30 and the sleeve 28. Section 32A has flutes 35 engaging the inner wall of the bore in sleeve 28. The spaces between the flutes defines a fluid discharge path 34. A finger actuator button 33 engages the upper ends of sleeve and stem. Stem 32 has a hollow lower vertical section 32B of larger cross sectional area than section 32A but smaller than the cross sectional area of cylinder 10B. Section 32B has an upper end with a recess or groove 36 in its top surface which is engageable with ring 30B of piston 30. Section 32B has a lower open end with a vertically elongated recess 32C therein. This lower end has a downwardly extending ring 32D.

As will be explained in more detail below, piston 30 and section 32B cooperate to form a port controlling access to the fluid discharge path 34. When ring 30B engages groove 36, the port is closed and fluid cannot be discharged through path 34. When ring 30B is approximately spaced from groove 36, the port is open and fluid can be discharged through path 34.

A second hollow vertical piston 38 is vertically slidable in the second cylinder. Piston 38 has an enlargement 38A intermediate its ends which engages and seals to the inner wall of the second cylinder at all times except when enlargement 38A is aligned with recess 16 at the upper end of cylinder 10B. As will be explained in more detail below, when this alignment takes place, the enlargement 38A is spaced from recess 16 and fluid or air can pass therebetween.

The upper end of piston 38 is closed and the upper section 38B above the enlargement is engagable with the vertical recess 32C. Enlargement 38A has a horizontal circular groove 38C which is engaged by ring 32D when section 38B engages recess 32C.

A first compression spring 40 is disposed within cylinder 10A with its upper end bearing against enlargement 28A and its lower end bearing against the lower end of piston 30. A second compression spring 42 is disposed within cylinder 10B with its upper end bearing against enlargement 38A and its lower end bearing against the lower end of cylinder 10B.

OPERATION OF THE PREFERRED EMBODIMENT AFTER IT IS FULLY PRIMED

This operation is explained with reference to FIGS. 1-5. When this embodiment is fully primed and at rest, the portion of the cylinder 10A which is subtended by the inner wall of this cylinder, stem 32, and the two pistons defines a pump chamber and is filled with fluid. The enlargement 38A is aligned with recess 16. When the actuator 33 is depressed, the pistons, sleeve and stem move downward reducing the volume of fluid in the first cylinder. When the second piston 38 is lowered, enlargement 38A is moved out of alignment with recess 16, forming a seal between enlargement 38A and the second cylinder. The fluid is displaced from the first cylinder into that portion of the second cylinder 10B which is disposed above the enlargement 38A. The volume of fluid remains constant up to the point of discharge. Because of the differences in diameter between the two pistons, piston 38 moves further downward relative to piston 30. This process continues until a predetermined volume of fluid has been displaced into the second cylinder.

The pressure within the pump chamber is a function of spring forces which act against the pistons. Due to the increased fluid pressure, the first piston travels upward relative to the stem. The spring gradient [or rate] of the first spring is significantly higher than that of the second spring. Consequently, the relative motion of the first piston is significantly smaller than the displacement of the second piston. The relative motions are mathematically defined and are a function of the cylinder diameters and spring design. These parameters can be so chosen that the first piston will disengage from the stem at any point during the downstroke, thus opening the port and allowing fluid to be discharged. At one extreme, the port can be made to open at the moment that all of the fluid has been displaced from the pump chamber to the second cylinder.

Once the port is opened, the second piston begins to travel upward under the force of the second spring and expels the fluid. This expulsion takes place before the second piston engages the stem. From this point onward, the second piston and the stem move upward as a unit. When the second enlargement becomes aligned with recess 16, a fluid conduction path is established between the fluid in the container, via the dip tube and the space between the enlargement and the inner wall in the second cylinder, and suction force pulls the fluid upward into the pump chamber.

The dosage accuracy can be enhanced by forcing the second piston to engage opening 14 before the port is opened. When the second piston reaches this opening, the reduction of volume in the first chamber, because of downward actuation, displaces the first piston only, causing the port to open. The motions of both pistons is effectively arrested while the stem and sleeve continue to travel downward. Under these conditions, the dispenser delivers highly accurate dosage, independently of the method of actuation.

PRIMING OPERATION OF THE PREFERRED EMBODIMENT

Figure 5:
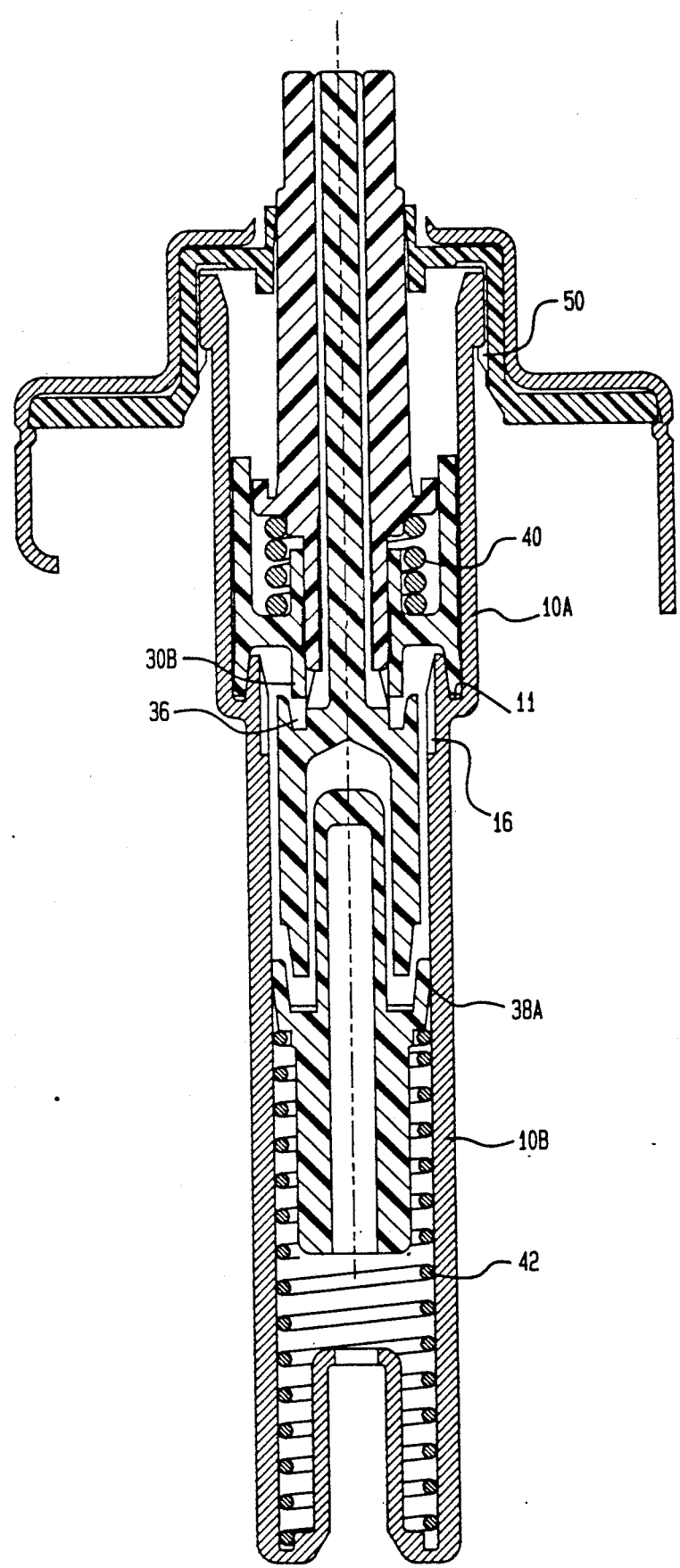
FIG. 5 is a vertical cross sectional view of the preferred embodiment shown at the bottom of the downstroke just before completion of the dispensing operation. This FIG. 5 also shows the preferred embodiment at the bottom of the downstroke during priming.

Before the dispenser is charged with fluid, it contains air. During operation in air, since air is compressible, the second piston is not displaced into the second cylinder in direct proportion to the displacement of the first piston. [The direct proportion displacement ensues when the dispenser is primed because the fluid is not compressible.] The relative displacement of the second piston away from the stem is proportional to the increase in internal pressure, which is inversely proportional to the reduction in volume. At the end of the downstroke, the first piston then engages the recess 11. This action arrests the downward motion of the first piston, while the stem and sleeve continue downward travel, opening the port. Once the port is opened, the compressed air within the dispenser is discharged through the discharge path between stem and sleeve. FIG. 5 illustrates the dispenser at the bottom of the downstroke during priming.

Figure 6:
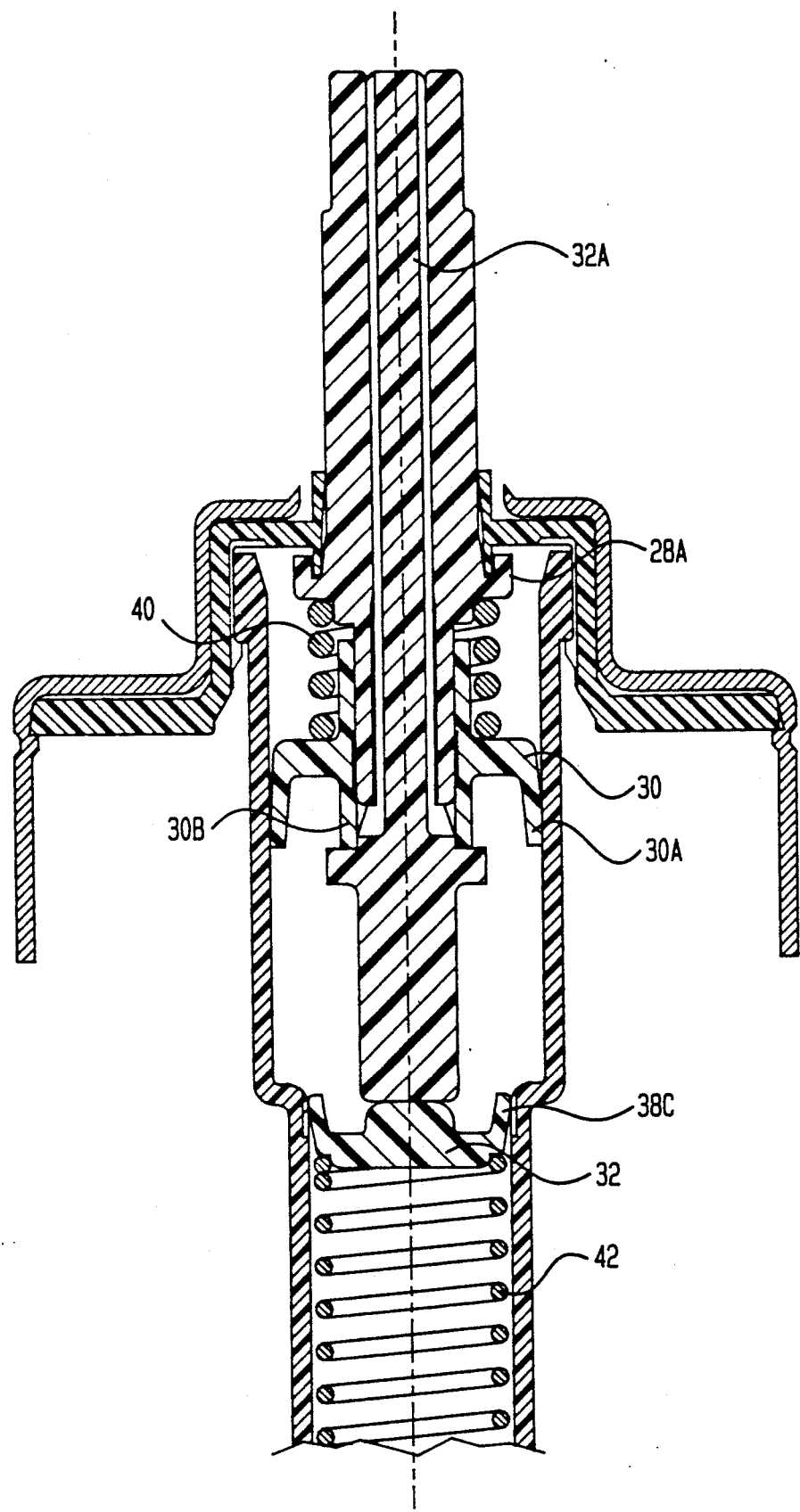
FIG. 6 is a vertical cross section of a second embodiment shown at the top of the downstroke.

FIG. 6 shows a simplified form of the dispenser. However, it still has sleeve 38, stem 32, first piston 30, second piston 38, first spring 40 and second spring 42 and body 10 with first cylinder 10A and second cylinder 10B. The stem and the pistons are somewhat differently shaped, but all parts function in the manner previously described.

While the invention has been described with particular reference to the embodiments shown in the drawings, the protection thereof is to be limited only by the terms of the claims which follow.

What is claimed is:

1. A finger actuated pump dispenser mounted on a fluid containing vessel which when actuated will discharge fluid at a predetermined pressure and will deliver a predetermined dosage regardless of the method of actuation, the dispenser comprising:

a vertical hollow elongated body having an upper section defining a first hollow vertical cylinder with a first diameter and open upper end and an integral lower section defining a second hollow vertical cylinder with a second and smaller diameter and a closed lower end with a central opening, the lower end of the first cylinder being joined to an open upper end of the second cylinder, the body having a first vertical bore extending through both cylinders;

a collar having a central opening aligned with the first bore and enclosing the upper end of the first cylinder;

a sleeve open at upper and lower ends and having a first enlargement intermediate these ends, the sleeve having a second vertical bore aligned with the first bore, the portion of the sleeve intermediate the upper end and the first enlargement extending upwardly through the collar opening with the first enlargement being disposed below the collar, the first enlargement and the remaining portion of the sleeve being disposed within the first cylinder;

a first hollow vertical piston having an upper open end and a lower closed end having a central opening which is aligned with the first bore, the first piston being disposed and vertically slidable along the sleeve within the first cylinder;

a vertical stem having an upper vertical section with relatively small cross sectional area which extends upwardly through the first piston and through the second bore, the upper section being spaced inwardly from the second bore, the space between the upper section and the inner wall of the second bore defining a fluid discharge path, the stem having an integral lower vertical section with a cross sectional area which is larger than that of the upper section and smaller than that of the second cylinder, the upper end of the lower section being adjacent the lower end of the first piston;

a second vertical piston vertically slidable in the second cylinder with an upper end adjacent and engagable with the lower end of the lower section, the second piston having a second enlargement intermediate its ends which engages the inner wall of the second cylinder;

first spring means disposed within the first cylinder between the lower end of the first piston and the first enlargement;

second spring means disposed within the second cylinder between the lower end of the second cylinder and the second enlargement; and means associated with the second piston and the second cylinder and actuated during at a selected position of the second piston with respect to the second cylinder during an upstroke to establish a fluid transfer path between the fluid in the container and a pump chamber formed by the space subtended by the inner wall of the first cylinder, the stem and the two pistons.

2. The dispenser of claim 1 wherein the means associated with the second piston and cylinder includes an enlarged recess disposed in the inner wall of the second cylinder at its upper end, said fluid transfer path being established when the second enlargement is aligned with and spaced from said recess.

3. The dispenser of claim 2 further including actuator means connected to the upper end of the upper stem section and the upper end of the sleeve.

4. The dispenser of claim 3 wherein the lower end of the first cylinder has a horizontal groove adjacent the upper end of the second cylinder, the lower end of the first piston being engagable with said groove.

5. The dispenser of claim 3 wherein the first piston and the stem cooperate to define a port which when open permits fluid to be discharged through the fluid discharge port and when closed blocks the discharge of fluid, the port being closed when the lower end of the first piston engages the upper end of the lower stem section of the stem and being closed when the lower end of the first piston is spaced from the upper end of the lower stem section.

6. The dispenser of claim 5 wherein the upper end of the lower stem section has a horizontal recess and the lower end of the first piston has a downwardly extending inner ring, the port being closed when the ring engages the recess and being open when the ring is spaced from the recess.

7. The dispenser of claim 5 wherein the lower stem section has a vertical recess and the upper end of the second piston extends into the recess when the second piston engages the lower end of the lower stem section.

8. The dispenser of claim 7 wherein the upper stem section is solid and the lower stem section is hollow.

9. The dispenser of claim 8 wherein the second enlargement has an upper surface with a horizontal groove and the lower end of the lower stem section has a ring which engages the horizontal groove when the second piston engages the lower end of the lower stem section.

10. The dispenser of claim 9 wherein the central opening in the lower end of the second cylinder is disposed above the remainder of the lower end, the downward movement of the second piston being limited at the position at which the lower end of the second piston engages the central opening.

11. A finger actuated pump dispenser mounted on a fluid containing vessel which when actuated will discharge fluid at a predetermined pressure and will deliver a predetermined dosage regardless of the method of actuation, the dispenser comprising:

a vertical hollow elongated body having an upper section defining a first hollow vertical cylinder with a first diameter and open upper end and an integral lower section defining a second hollow vertical cylinder with a second and smaller diameter and a closed lower end with a central opening, the lower end of the first cylinder being joined to an open upper end of the second cylinder, the body having a first vertical bore extending through both cylinders;

a collar having a central opening aligned with the first bore and enclosing the upper end of the first cylinder;

a sleeve open at upper and lower ends and having a first enlargement intermediate these ends, the sleeve having a second vertical bore aligned with the first bore, the portion of the sleeve intermediate the upper end and the first enlargement extending upwardly through the collar opening with the first enlargement being disposed below the collar, the first enlargement and the remaining portion of the sleeve being disposed within the first cylinder;

a first hollow vertical piston having an upper open end and a lower closed end having a central opening which is aligned with the first bore, the first piston being disposed and vertically slidable along the sleeve within the first cylinder;

a vertical stem having an upper vertical section with relatively small cross sectional area which extends upwardly through the first piston and through the second bore, the upper section being spaced inwardly from the second bore, the space between the upper section and the inner wall of the second bore defining a fluid discharge path, the stem having an integral lower vertical section with a cross sectional area which is larger than that of the upper section and smaller than that of the second cylinder, the upper end of the lower section being adjacent the lower end of the first piston;

a second vertical piston vertically slidable in the second cylinder with an upper end adjacent and engagable with the lower end of the lower section, the second piston having a second enlargement intermediate its ends which engages the inner wall of the second cylinder;

first spring means disposed within the first cylinder between the lower end of the first piston and the first enlargement;

second spring means disposed within the second cylinder between the lower end of the second cylinder and the second enlargement; and means associated with the second piston and the second cylinder and actuated during at a selected position of the second piston with respect to the second cylinder during an upstroke to establish a fluid transfer path between the fluid in the container and a pump chamber formed by the space subtended by the inner wall of the first cylinder, the stem and the two pistons, said means associated with the second piston and cylinder including an enlarged recess disposed in the inner wall of the second cylinder at its upper end, said fluid transfer path being established when the second enlargement is aligned with and spaced from said recess; and actuator means connected to the upper end of the upper stem section and the upper end of the sleeve.

* * * * *